United States Patent
Chon et al.

(10) Patent No.: US 8,045,057 B2
(45) Date of Patent: Oct. 25, 2011

(54) SYNCHRONIZATION DETECTOR OF VIDEO SIGNAL PROCESSOR AND SYNCHRONIZATION SELECTOR INCLUDING THE SYNCHRONIZATION DETECTOR

(75) Inventors: E-woo Chon, Seoul (KR); Hyung-jun Lim, Suwon-si (KR); Jae-hong Park, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 1304 days.

(21) Appl. No.: 11/699,735

(22) Filed: Jan. 30, 2007

(65) Prior Publication Data
US 2007/0182851 A1 Aug. 9, 2007

(30) Foreign Application Priority Data
Feb. 3, 2006 (KR) .................. 10-2006-0010582

(51) Int. Cl.
*H04N 9/475* (2006.01)
(52) U.S. Cl. ......... 348/513; 348/525; 348/530; 348/533
(58) Field of Classification Search .................. 348/513, 348/525, 530, 533
See application file for complete search history.

(56) References Cited

U.S. PATENT DOCUMENTS

| | | | | |
|---|---|---|---|---|
| 4,211,813 A | 7/1980 | Gravisse et al. | ............... | 428/263 |
| 5,466,526 A | 11/1995 | Magata | .......................... | 428/372 |
| 5,779,950 A | 7/1998 | Kang | ........................... | 264/40.4 |
| 5,851,668 A | 12/1998 | Sandor et al. | ................ | 428/397 |
| 6,034,040 A | 3/2000 | Ozbalik et al. | ................ | 508/469 |
| 6,126,879 A | 10/2000 | Sandor et al. | .............. | 264/177.2 |
| 6,210,798 B1 | 4/2001 | Sandor et al. | ................ | 428/364 |
| 6,271,888 B1 * | 8/2001 | Lares et al. | .................... | 348/521 |
| 6,332,993 B1 | 12/2001 | Jen | ................................ | 264/103 |
| 6,599,444 B2 | 7/2003 | Burnell-Jones | .......... | 252/301.36 |
| 7,074,499 B2 | 7/2006 | Schuner et al. | ............... | 428/690 |
| 2002/0035755 A1 | 3/2002 | Widdemer | ..................... | 8/94.15 |
| 2004/0153495 A1 | 8/2004 | Jun | | |

FOREIGN PATENT DOCUMENTS

| | | |
|---|---|---|
| EP | 0462275 A1 | 12/1991 |
| EP | 1291405 A1 | 3/2003 |
| JP | 2001-346144 | 12/2001 |
| JP | 2002-305670 | 10/2002 |
| KR | 90-13733 | 7/1990 |
| KR | 10-2004-0048608 | 6/2004 |

OTHER PUBLICATIONS

Holofiber, *How It Works*, Jan. 30, 2007, www.holofiber.com/howitworks.php.

* cited by examiner

*Primary Examiner* — Brian Yenke
*Assistant Examiner* — Mustafizur Rahman
(74) *Attorney, Agent, or Firm* — Onello & Mello LLP

(57) ABSTRACT

A synchronization detector of a video signal processor includes a line buffer, a parameter extraction unit and synchronization detection unit. The line buffer sequentially stores a digital video signal corresponding to an input analog video signal, line by line of the input analog video signal. The parameter extraction unit continuously extracts horizontal synchronization parameters from the digital video signal stored line by line and continuously extracts vertical synchronization parameters from a portion of the digital video signal stored line by line. The synchronization detection unit generates horizontal and vertical synchronization signals of the input analog video signal using time information related to local minimum values of the horizontal synchronization parameters and time information related to local minimum values of the vertical synchronization parameters.

15 Claims, 8 Drawing Sheets

SYNCHRONIZATION DETECTOR OF VIDEO SIGNAL PROCESSOR AND SYNCHRONIZATION SELECTOR INCLUDING THE SYNCHRONIZATION DETECTOR

CROSS-REFERENCE TO RELATED PATENT APPLICATION

This application claims the benefit of Korean Patent Application No. 10-2006-0010582, filed on Feb. 3, 2006, in the Korean Intellectual Property Office, the disclosure of which is incorporated herein in its entirety by reference.

BACKGROUND OF THE INVENTION

1. Field of the Invention

The present invention relates to a video signal processor, and more particularly, to a synchronization detector of a video signal processor and a synchronization selector including the synchronization detector.

2. Description of the Related Art

Display systems including an optical disk player such as a digital versatile disk (DVD) player, a video cassette recorder, a TV system and a personal computer commonly include an apparatus for processing an input analog video signal.

An image displayed on a display system is comprised of a plurality of frames. In an interlaced scan method, a single frame includes two fields, that is, an odd field (or top field) and an even field (or bottom field) and each, single, field consists of a plurality of scan lines (or lines). A vertical synchronization signal VSYNC contains timing information for a field and corresponds to a single field and a horizontal synchronization signal contains timing information for a scan line and corresponds to a single scan line.

FIG. 1 is a block diagram of a conventional video signal processor 10. Referring to FIG. 1, the video signal processor 10 includes a Y/C separator 12, a synchronization detector 14 and a demodulator 16. The synchronization detector 14 detects a synchronization signal SYNC including a horizontal synchronization signal and a vertical synchronization signal that respectively define a horizontal scan period and a vertical scan period from an input analog video signal IVS.

The input analog video signal IVS can be a composite video blanking synchronization (CVBS) signal, a separate video signal or a component signal. The CVBS can be received through a tuner (not shown) of a video signal processor such as a television (TV) system. The separate video signal includes a luminance signal Y and a chrominance signal C and is input to a video signal processor such as a video cassette recorder. The component signal includes Y/Cb/Cr signals and is input to a video signal processor such as a DVD player.

The Y/C separator 12 separates (or extracts) the luminance signal Y and the chrominance signal C from the input analog video signal IVS based on the synchronization signal SYNC detected by the synchronization detector 14 when the input analog video signal IVS is a CVBS signal. When the input analog video signal IVS is a separate video signal or a component signal, however, the input video signal IVS is directly input to the demodulator 16 without being separated into the luminance signal Y and the chrominance signal C because the separate video signal or the component signal has already been separated into the luminance signal Y and the chrominance signal C.

The demodulator 16 interpolates the luminance signal Y and the chrominance signal C and generates a color signal suitable for the standard of a display device such as a liquid crystal display (LCD). That is, the demodulator 16 generates red, green and blue signals or a color signal in the form of a luminance signal Y and chrominance signals Cb and Cr according to the standard of the display device. The display device displays an image corresponding to the color signal generated by the demodulator 16 so that a user can see the image.

FIG. 2 illustrates a CVBS signal 20 corresponding to the input analog video signal IVS of FIG. 1. Referring to FIG. 2, the CVBS signal 20 includes a plurality of sections each having a front porch signal 21, a horizontal synchronization pulse 22, a back porch signal 23 including a color burst signal 24, and an active video signal 25. The waveform of the CVBS signal 20 having 525 lines corresponding to the NTSC (National Television System Committee) method is illustrated in FIG. 10.

Each of scan lines of the CVBS signal 20 is initiated at the falling edge FE of the horizontal synchronization pulse 22 and ends at the falling edge of the next horizontal synchronization pulse 22. The front porch signal 21 and the back porch signal 23 has a DC voltage referred to as a blank level BL (0V, for example). The horizontal synchronization pulse 22 has a DC voltage referred to as a synchronization level SL. The falling edge FE and the rising edge RE of the horizontal synchronization pulse 22 are determined based on a DC threshold level TL. For example, the falling edge FE and the rising edge RE of the horizontal synchronization pulse 22 can be set to 50% of the amplitude of the horizontal synchronization pulse 22. The amplitude of the horizontal synchronization pulse 22 corresponds to the absolute value of a difference between the blank level BL and the synchronization level SL.

A method of detecting a horizontal synchronization signal and a vertical synchronization signal from the CVBS signal 20 using the synchronization detector 14 will now be explained.

The blank level BL and the synchronization level SL are detected and a threshold level TL is determined using the detected blank level BL and the synchronization level SL. The falling edges FE or the rising edges RE of the horizontal synchronization pulses 22 are detected based on the determined threshold level TL. The horizontal synchronization signal including position information (that is, timing information) of the horizontal synchronization pulses 22 is detected using a difference between the detected falling edges FE or a difference between the detected rising edges RE. The vertical synchronization signal can be detected by counting the detected horizontal synchronization signal by half the number of lines of the CVBS signal 20.

However, the method of detecting the horizontal synchronization signal and the vertical synchronization signal cannot detect horizontal and vertical synchronization signals correctly when the blank level BL and the synchronization level SL become varied due to noise or when the falling edges FE or the rising edges RE of the horizontal synchronization pulses 22 become distorted (or damaged) due to noise.

SUMMARY OF THE INVENTION

Embodiments of the present invention provide a synchronization detector of a video signal processor, which is robust against noise.

Embodiments of the present invention also provide a synchronization selector of a video signal processor (or video signal processing system) including the synchronization detector.

According to an aspect of the present invention, there is provided a synchronization detector of a video signal processor comprising a line buffer that sequentially stores a digital video signal corresponding to an input analog video signal line by line of the input analog video signal, a parameter extraction unit that continuously extracts horizontal synchronization parameters from the digital video signal stored line by line and that continuously extracts vertical synchronization parameters from a portion of the digital video signal stored line by line, and a synchronization detection unit that generates horizontal and vertical synchronization signals of the input analog video signal using time information related to local minimum values of the horizontal synchronization parameters and time information related to local minimum values of the vertical synchronization parameters.

The input analog video signal can be a CVBS signal, a separate video signal or a component signal.

The synchronization detector may further comprise a video signal processing unit that converts the input analog video signal into a digital video signal to conform the input analog video signal to a standard level of a video signal processed in the video signal processor and that removes a color component from the digital video signal to output a filter output signal including a luminance signal and a synchronization signal, the filter output signal corresponding to the digital video signal.

The video signal processing unit may comprise an analog-to-digital converter that samples the input analog video signal and that converts the input analog video signal into the digital video signal to conform the input analog video signal to the standard level of the video signal, and a low pass filter that low-pass-filters the output signal of the analog-to-digital converter to remove a color burst signal and a chrominance signal and that generates the filter output signal.

The line buffer may comprise a bit value output unit that quantizes the filter output signal line by line and that outputs bits corresponding to the quantization values, an upper bit selection unit that selects upper bits from the bits and that outputs the upper bits, and line memories that sequentially store the upper bits corresponding to data included in the lines, respectively.

The parameter extraction unit may add up the upper bits respectively stored in the line memories for continuous samples included in each line to obtain sum values corresponding to the number of the line memories, add up the sum values to obtain the horizontal synchronization parameter at a predetermined time, and add up the upper bits stored in a part of the line memories to obtain the vertical synchronization parameter at a predetermined time.

The synchronization detection unit may comprise a horizontal synchronization detection unit that generates the horizontal synchronization signal using time information related to the local minimum values of the horizontal synchronization parameters, and a vertical synchronization detection unit that generates the vertical synchronization signal using time information related to the local minimum values of the vertical synchronization parameters.

The horizontal synchronization detection unit may comprise a horizontal counter that outputs horizontal count values, a horizontal synchronization position output unit that outputs horizontal synchronization positions corresponding to time information related to the local minimum values of the horizontal synchronization parameters in response to the horizontal count values, a line length output unit that calculates a difference between the horizontal synchronization positions to generate the current line length detection value, that resets the horizontal counter whenever generating the current line length detection value, that adds the current line length detection value to a previous line length detection value to which a first horizontal coefficient has been multiplied, that divides the added value by a second horizontal coefficient, and that stores and outputs the resultant value as a final line length detection value, and a horizontal synchronization signal generator that generates the horizontal synchronization signal using a horizontal position count value that is one of the horizontal count values and corresponds to the horizontal synchronization positions and the final line length detection value. The final line length detection value is used as a previous line length detection value when a subsequent final line length detection value is calculated.

The vertical synchronization detection unit may comprise a vertical counter that outputs vertical count values, a vertical synchronization position output unit that outputs vertical synchronization positions corresponding to time information related to the local minimum values of the vertical synchronization parameters in response to the vertical count values, a field length output unit that calculates a difference between the vertical synchronization positions to generate the current field length detection value, that resets the vertical counter whenever generating the current field length detection value, that adds the current field length detection value to a previous field length detection value to which a first vertical coefficient has been multiplied, that divides the added value by a second vertical coefficient, and that stores and outputs the resultant value as a final field length detection value, and a vertical synchronization signal generator that generates the vertical synchronization signal using a vertical position count value that is one of the vertical count values and corresponds to the vertical synchronization positions and the final field length detection value. The final field length detection value is used as a previous field length detection value when a subsequent final field length detection value is calculated.

The vertical synchronization detection unit may further comprise a line system detector that detects a line system of the input analog video signal in response to the final field length detection unit, and a field detector that detects whether the field of the input analog video signal is an odd field or an even field using the phase relation of the horizontal synchronization signal and the vertical synchronization signal.

According to another aspect of the present invention, there is provided a synchronization selector of a video signal processor comprising a first synchronization detector that detects a synchronization signal in a video signal processor receiving an input analog video signal including lines having a specific length, a second synchronization detector that detects a synchronization signal in a video signal processor receiving an input analog video signal including lines having different lengths, a multiplexer that selects one of the synchronization signals respectively output from the first and second synchronization detectors in response to a selection signal and that outputs the selected synchronization signal, and a controller that generates the select signal in response to at least one of the input analog video signal, a field length of the input analog video signal and a length of a line included in the field of the input analog video signal, which are detected by the first and second synchronization detectors. The first synchronization detector comprises a line buffer that sequentially stores a digital video signal corresponding to the input analog video signal, line by line of the input analog video signal, a parameter extraction unit that continuously extracts horizontal synchronization parameters from the digital video signal stored line by line and that continuously extracts vertical synchronization parameters from a portion of the digital video signal stored line by line, and a synchronization detection unit that outputs the field length and the line length using time information related to local minimum values of the horizontal synchronization parameters and time information related to local minimum values of the vertical synchronization parameters.

The output signal of the first synchronization detector may be used for a TV system or an optical disk player and the output signal of the second synchronization detector may be used for a VCR.

The controller may calculate the absolute value of a difference between the line lengths of neighboring lines and generate the selection signal for selecting the output signal of the first synchronization selector when the absolute value is less than or equal to a predetermined reference value.

The controller may calculate the absolute values of differences between the line lengths of neighboring lines and generate the selection signal for selecting the output signal of the first synchronization detector when the sum of the absolute values in the field length is less than or equal to a predetermined reference value.

The controller may calculate a value obtained by dividing the field length by ½ of the number of the lines of the input analog video signal and the absolute value of a value obtained by subtracting the line length from the divided field length and generate the selection signal for selecting the output signal of the first synchronization detector when the sum of the absolute values in the field length is less than or equal to a predetermined reference value.

The controller may comprise a line counter that counts the lines of the input analog video signal and generates the selection signal for selecting the output signal of the first synchronization detector when the value counted by the line counter is continuous.

The synchronization detector of a video signal processor according to the present invention converts the input analog video signal into bit values corresponding to quantization values, sequentially stores the bit values in the line buffer, and generates the horizontal and vertical synchronization signals using time information related to local minimum values of the bit values. Thus, the horizontal and vertical synchronization signals can be effectively detected even when the input analog video signal includes noise.

Furthermore, the synchronization selector of a video signal processor according to the present invention can select a synchronization signal suitable for a TV system, an optical disk player or a VCR using the line length and the field length detected from the first synchronization detector suitable for detecting a synchronization signal from an analog video signal input to the TV system or the optical disk player and the second synchronization detector suitable for detecting a synchronization signal from an analog video signal input to the VCR.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EMBODIMENTS OF THE INVENTION

Figure 1:
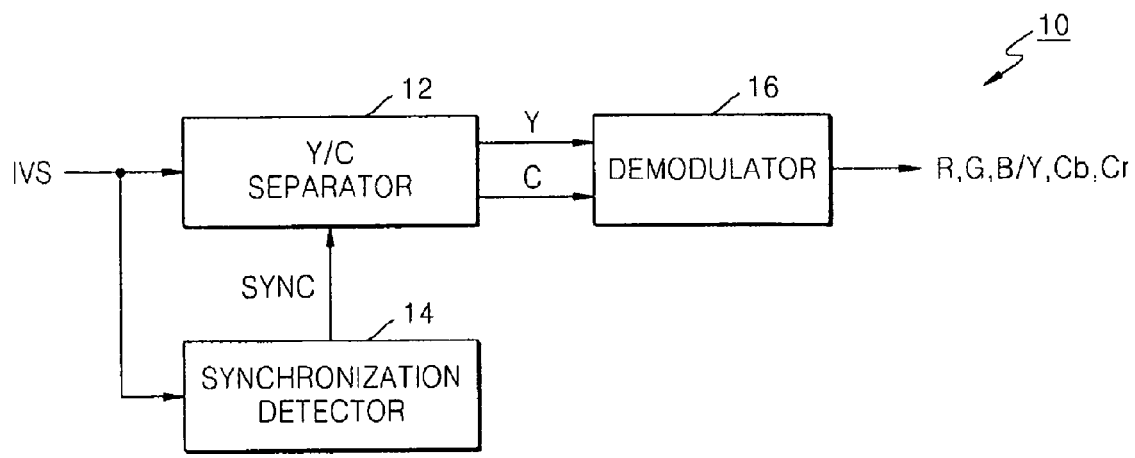
FIG. 1 is a block diagram of a conventional video signal processor.
Figure 2:
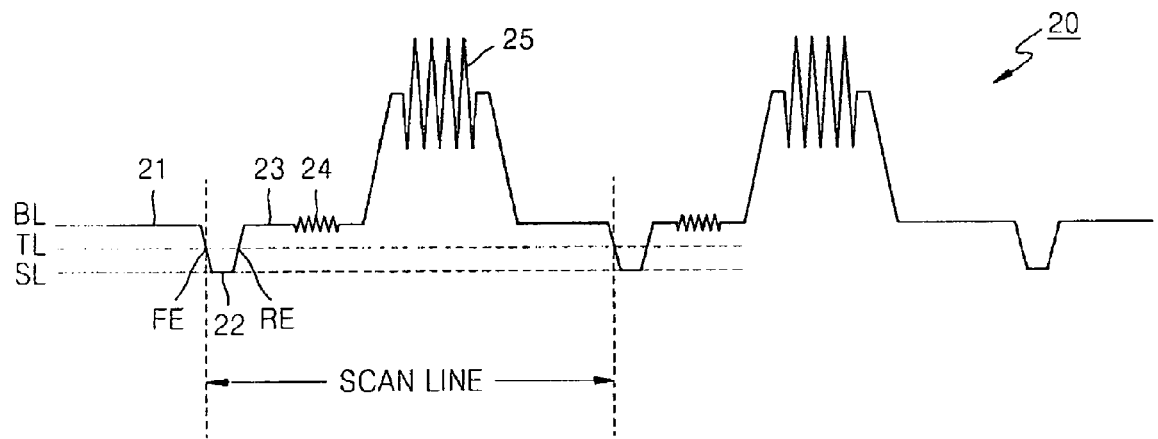
FIG. 2 illustrates a CVBS signal that is used as an input analog video signal of FIG. 1.

Example embodiments of the present invention will now be described more fully with reference to the accompanying drawings. The invention may, however, be embodied in many different forms and should not be construed as being limited to the embodiments set forth herein; rather, these embodiments are provided so that this disclosure will be thorough and complete. Throughout the drawings, like reference numerals refer to like elements.

Figure 3:
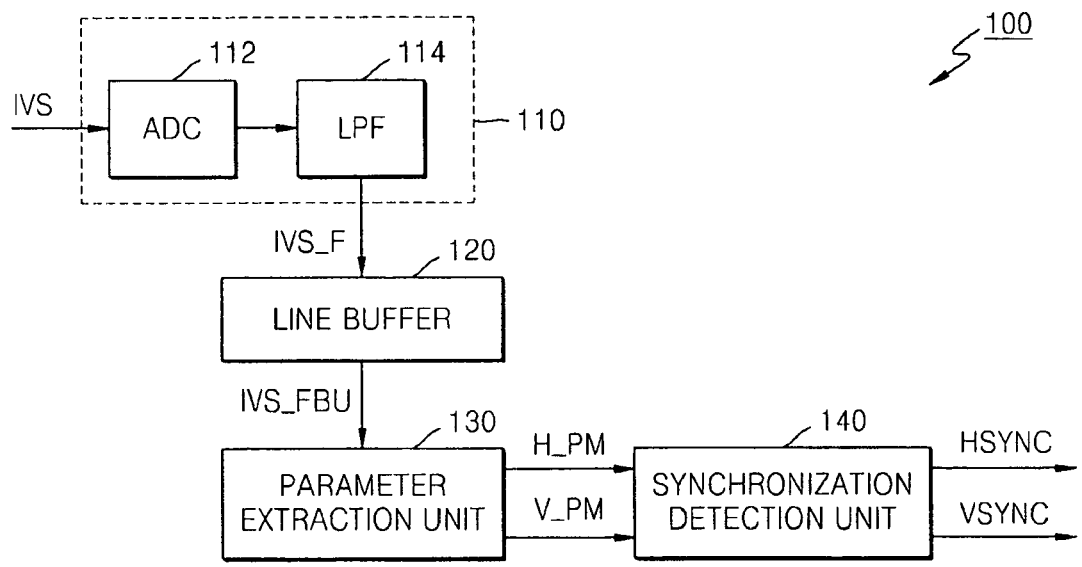
FIG. 3 is a block diagram of a synchronization detector of a video signal processor according to an embodiment of the present invention.

FIG. 3 is a block diagram of a synchronization detector 100 of a video signal processor according to an embodiment of the present invention. Referring to FIG. 3, the synchronization detector 100 of the video signal processor includes a video signal processing unit 110, a line buffer 120, a parameter extraction unit 130 and a synchronization detection unit 140.

The video signal processing unit 110 includes an analog-to-digital converter (ADC) 112 and a low pass filter (LPF) 114. The video signal processing unit 110 converts an input analog video signal IVS into a digital video signal to suit the input analog video signal IVS to a standard level of video signals (the standard level of the NTSC or PAL (Phase Alternation by Line) method) processed by the video signal processor and removes a color component from the digital video signal to output a signal IVS_F including a luminance signal and a synchronization signal.

The ADC 112 samples the input analog video signal IVS and converts the input analog video signal IVS into a digital video signal to suit the input analog video signal to the standard level of video signals. The input analog video signal IVS can, for example, be a CVBS signal, a separate video signal or a component signal.

The LPF 114, for example in the form of a digital filter, low-pass filters the digital video signal output from the ADC 112 to remove a color burst signal and a chrominance signal included in the digital video signal and outputs the signal IVS_F including the luminance signal and the synchronization signal.

The line buffer 120 includes a plurality of line memories (not shown). The line buffer 120 sequentially stores, line-by-line, the filter output signal IVS_F of the input analog video signal IVS output from the LPF 114.

Figure 4:
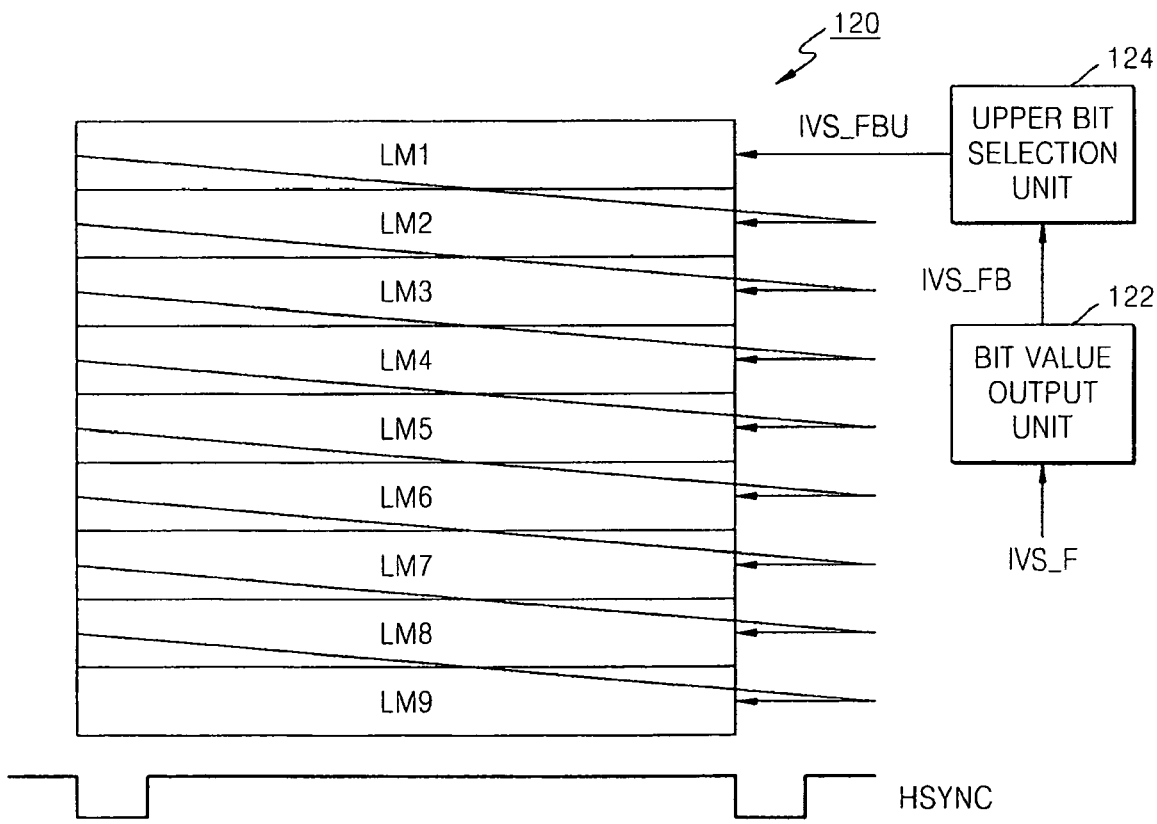
FIG. 4 is a diagram for explaining a line buffer of FIG. 3 according to an embodiment of the present invention.

FIG. 4 is a diagram for explaining the line buffer 120 of FIG. 3 according to an embodiment of the present invention. Referring to FIG. 4, the line buffer 120 includes 9 line memories LM1 through LM9, a bit value output unit 122 and an upper bit selection unit 124. Each of the line memories LM1 through LM9 can, for example, be composed of a single-port static random access memory (SRAM).

Each of the line memories LM1 through LM9 stores digital video data corresponding to a single scan line included in the input analog video signal IVS. A single scan line corresponds to a horizontal synchronization signal HSYNC of one period.

Video data corresponding to 858 samples is stored in each of the line memories LM1 through LM9 when the standard of the input analog video signal IVS is the NTSC standard and video data corresponding to 864 samples is stored in each of the line memories LM1 through LM9 when the standard of the input analog video signal IVS is the PAL standard. The video data stored in the line memories LM1 through LM9 will now be explained in detail.

The bit value output unit 122 quantizes the filter output signal IVS_F line by line. For example, the bit value output unit 122 quantizes the filter output signal IVS_F so that the filter output signal IVS_F has one of $2^{10}$ quantization values and outputs 10 bits IVS_FB corresponding to the quantization value.

The upper bit selection unit 124 selects upper 6 bits IVS_FBU from the 10 bits IVS_FB and outputs the upper 6 bits IVS_FBU so that the size of each of the line memories LM1 through LM9 can be reduced. The line memories LM1 through LM9 sequentially store the upper 6 bits continuously output from the upper bit selection unit 124, respectively. For example, the first line memory LM1 is the first to store an upper 6 bit IVS_FBU value and the ninth line memory LM9 is the last to store the upper 6-bit value.

Referring to FIG. 3, the parameter extraction unit 130 continuously extracts horizontal synchronization parameters H_PM from the whole of the filter output signal IVS_F stored line by line and continuously extracts vertical synchronization parameters V_PM from a part of the filter output signal IVS_F stored line by line. Specifically, the parameter extraction unit 130 extracts the horizontal synchronization parameters H_PM and the vertical synchronization parameters V_PM from the upper 6 bits IVS_FBU stored in the line buffer 120 and provides the horizontal synchronization parameters H_PM and the vertical synchronization parameters V_PM to the synchronization detection unit 140.

Figure 5A:
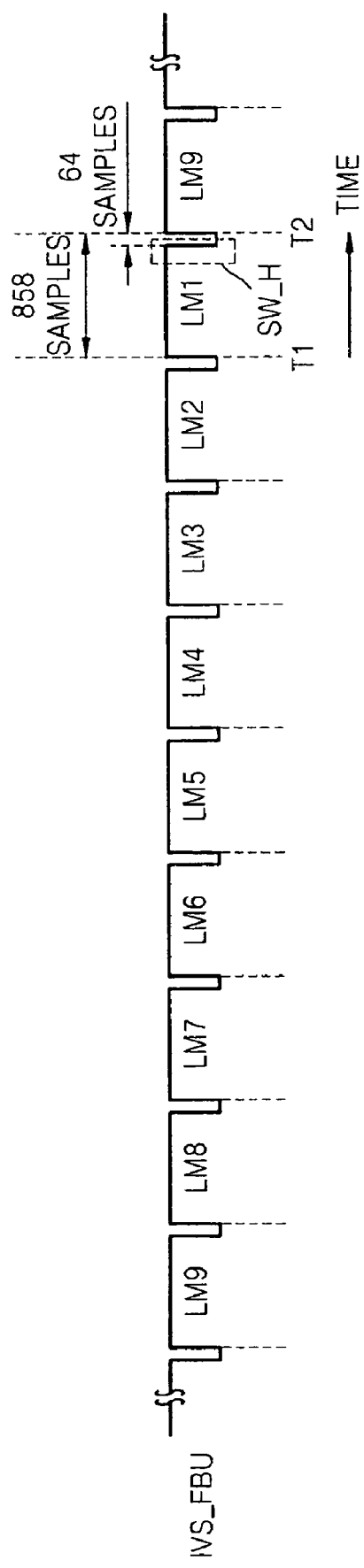
FIGS. 5A and 5B are diagrams for explaining an operation of a parameter extraction unit of FIG. 3 to extract a horizontal synchronization parameter from a line buffer.
Figure 5B:
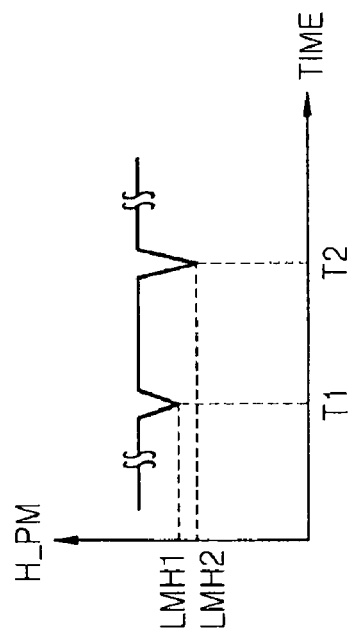

FIGS. 5A and 5B are diagrams for explaining an operation of the parameter extracting unit 130 of FIG. 3 to extract the horizontal synchronization parameters H_PM from the line buffer 120. FIG. 5A illustrates an example of upper 6 bits IVS_FBU stored in each of the line memories LM1 through LM9.

The parameter extraction unit 130 adds up the upper 6 bits IVS_FBU stored in each of the line memories LM1 through LM9 for a predetermined number-of continuous samples (for example, 64 continuous samples among 858 samples when the standard of the input analog video signal is NTSC). The parameter extraction unit 130 repeats this operation on each of the line memories LM1 through LM9 to obtain 9 sum values of the upper 6 bits and adds up the 9 sum values to obtain a horizontal synchronization parameter H_PM at a predetermined time. Specifically, the parameter extraction unit 130 adds up the upper 6 bits IVS_FBU stored in each of the line memories LM1 through LM9 in a horizontal sample window SW_H including the 64 continuous samples. The parameter extraction unit 130 repeats this operation on each of the line memories LM1 through LM9 to obtain 9 sum values of the upper 6 bits and adds up the 9 sum values to obtain a first horizontal synchronization parameter H_PM at the current time. The parameter extraction unit 130 also moves the horizontal sample window SW_H to the left by a time corresponding to a single sample and then performs the aforementioned addition operation in the moved horizontal sample window SW_H to obtain a second horizontal synchronization parameter H_PM at a time prior to the current time. The parameter extraction unit 130 moves the horizontal sample window SW_H to the right by a time corresponding to a single sample and then performs the aforementioned addition operation in the moved horizontal sample window SW_H to obtain a third horizontal synchronization parameter H_PM at a time after the current time.

A variation in the horizontal synchronization parameters H_PM with the lapse of time is illustrated in FIG. 5B. Referring to FIG. 5B, the horizontal synchronization parameters H_PM can have a local minimum value LMH1 at a time T1 and a local minimum value LMH2 at a time T2. When the line memories LM1 through LM9 respectively store the same upper 6-bit value, as illustrated in FIG. 5A, the local minimum value LMH1 is identical to the local minimum value LMH2.

Figure 6A:
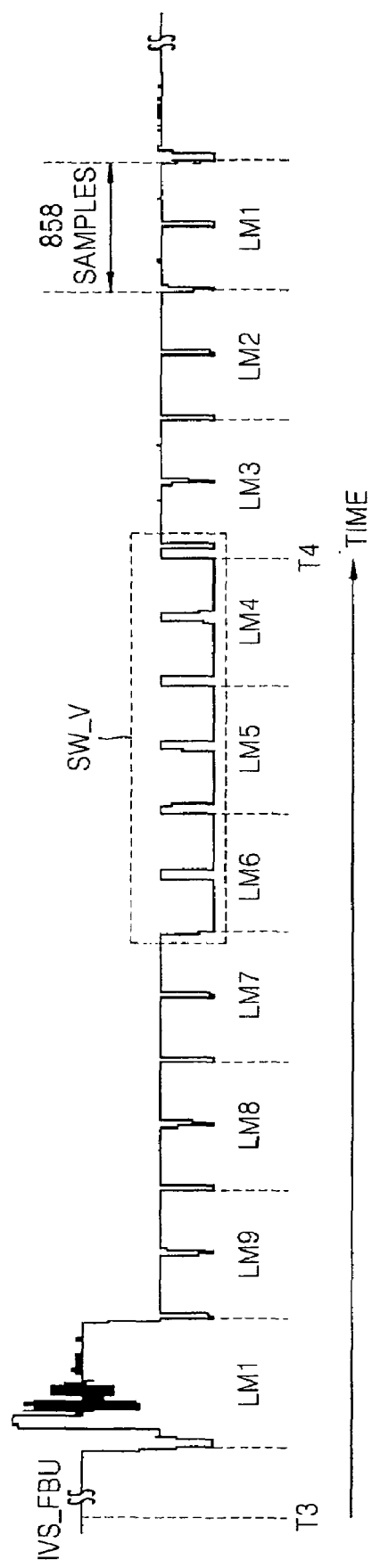
FIGS. 6A and 6B are diagrams for explaining an operation of the parameter extraction unit of FIG. 3 to extract a vertical synchronization parameter from a line buffer.
Figure 6B:
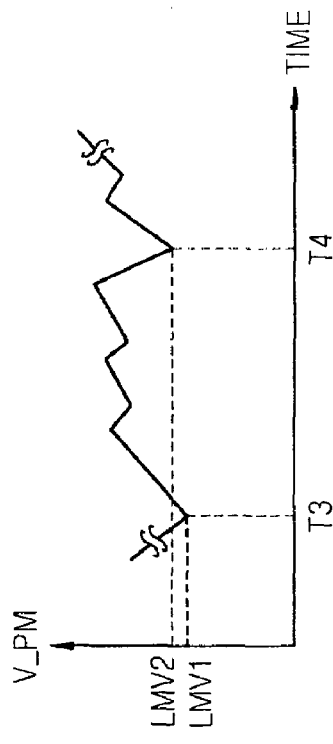

FIGS. 6A and 6B are diagrams for explaining an operation of the parameter extraction unit 130 of FIG. 3 to extract the vertical synchronization parameters from the line buffer 120. FIG. 6A illustrates another example of upper 6 bits IVS_FBU stored in each of the line memories LM1 through LM9.

The parameter extraction unit 130 adds up the upper 6 bits IVS_FBU stored in a subset of the line memories LM1 through LM9 (for example, fourth, fifth and sixth line memories LM4, LM5 and LM6) to obtain a vertical synchronization parameter V_PM at a predetermined time. Specifically, the parameter extraction unit 130 adds up upper 6 bits IVS_FBU stored in the fourth, fifth and sixth line memories LM4, LM5 and LM6 in a vertical sample window SW_V including 858*3 samples corresponding to NTSC standard to obtain a first vertical synchronization parameter V_PM at the current time. The parameter extraction unit 130 moves the vertical sample window SW_V to the left by a time corresponding to a single sample and then performs the aforementioned addition operation in the moved vertical sample window SW_V to obtain a second vertical synchronization parameter V_PM at a time prior to the current time. The parameter extraction unit 130 moves the vertical sample window SW_V to the right by a time corresponding to a single sample and then performs the aforementioned addition operation in the moved vertical sample window SW_V to obtain a third vertical synchronization parameter V_PM at a time after the current time.

A variation in the vertical synchronization parameters V_PM with the lapse of time is illustrated in FIG. 6B. Referring to FIG. 6B, the vertical synchronization parameters V_PM can have a local minimum value LMV1 at a time T3 and a local minimum value LMV2 at a time T4.

Figure 7:
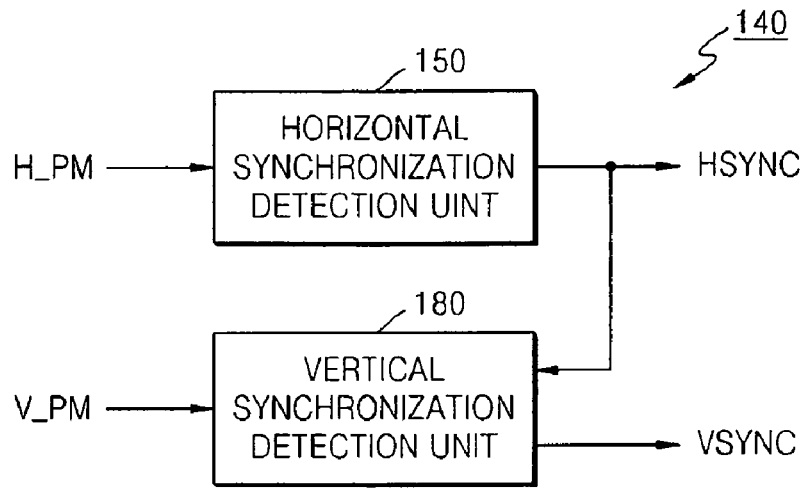
FIG. 7 is a block diagram of a synchronization detection unit of FIG. 3.

FIG. 7 is a block diagram of the synchronization detection unit 140 of FIG. 3. Referring to FIG. 7, the synchronization detection unit 140 includes a horizontal synchronization detection unit 150 and a vertical synchronization detection unit 180. The horizontal synchronization detection unit 150 generates a horizontal synchronization signal HSYNC using time information related to the local minimum values of the horizontal synchronization parameters H_PM. The vertical synchronization detection unit 180 generates a vertical synchronization signal VSYNC using time information related to the local minimum values of the vertical synchronization parameters V_PM.

Figure 8:
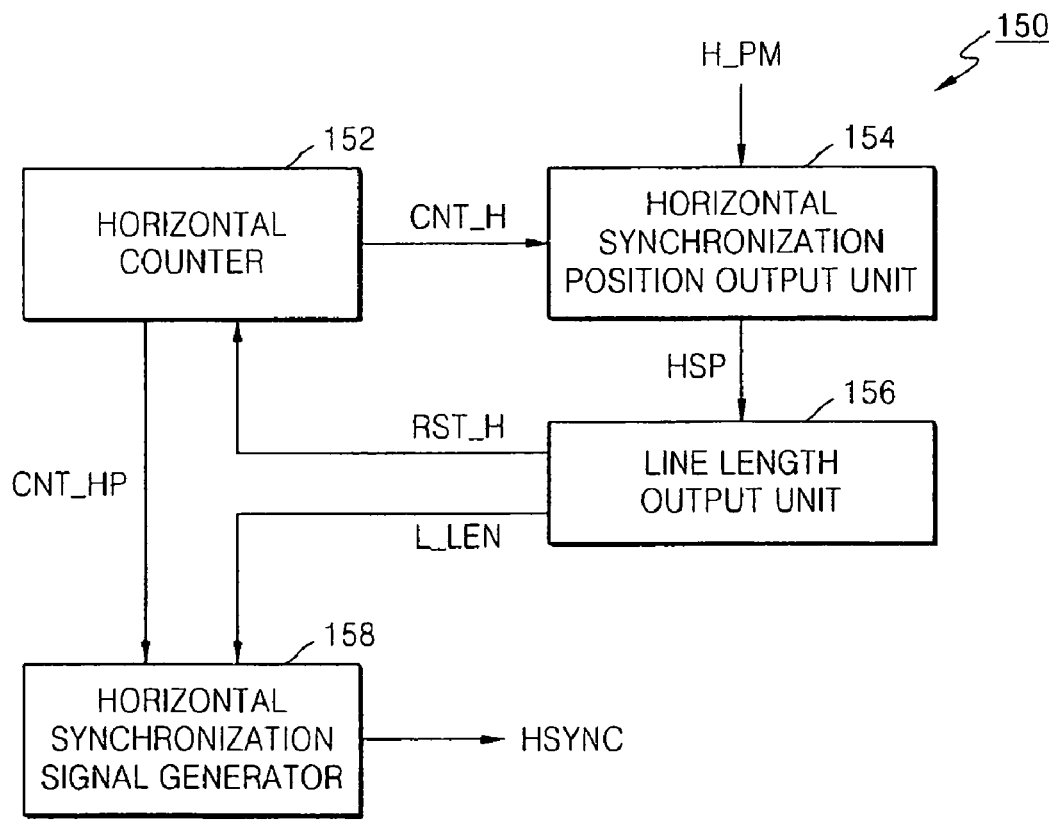
FIG. 8 is a block diagram of a horizontal synchronization detection unit of FIG. 7.

FIG. 8 is a block diagram of the horizontal synchronization detection unit 150 of FIG. 7. Referring to FIG. 8, the horizontal synchronization detection unit 150 includes horizontal counter 152, a horizontal synchronization position output unit 154, a line length output unit 156 and a horizontal synchronization signal generator 158.

The horizontal synchronization position output unit 154 outputs a horizontal synchronization position HSP that contains time information (for example, T1 or T2 of FIG. 5B) corresponding to a local minimum value (for example, LMH1 or LMH2 of FIG. 5B) of a horizontal synchronization parameter H_PM in response to horizontal count values CNT_H output from the horizontal counter 152.

The line length output unit 156 calculates a difference (for example, T2−T1) between horizontal synchronization positions HSP to generate the current line length detection value. The line length output unit 156 generates a horizontal reset signal RST_H to reset the horizontal counter 152 when the current line length detection value is generated.

The line length output unit 156 adds the current line length detection value to a previous line length detection value by which 127, as an example of a first horizontal coefficient, has been multiplied, divides the added value by 128, as an example of a second horizontal coefficient, and stores and outputs the resultant value as a final line length detection value L_LEN. The final line length detection value L_LEN is used as a previous line length detection value when a subsequent final line length detection value is calculated. The first horizontal coefficient represents a weighted value.

That is, the line length output unit 156 performs an operation represented by Equation 1 to output the final line length detection value L_LEN corresponding to an auto regression value. The final line length detection value L_LEN in the NTSC standard approximates the length of 858 samples through auto regression.

Final line length detection value=(127*previous line length detection value+current line length detection value)/128 [Equation 1]

The horizontal synchronization signal generator 158 generates the horizontal synchronization signal HSYNC using a horizontal position count value CNT_HP that is one of the horizontal count values CNT_H and corresponds to the horizontal synchronization position HSP and the final line length detection value L_LEN.

Figure 9:
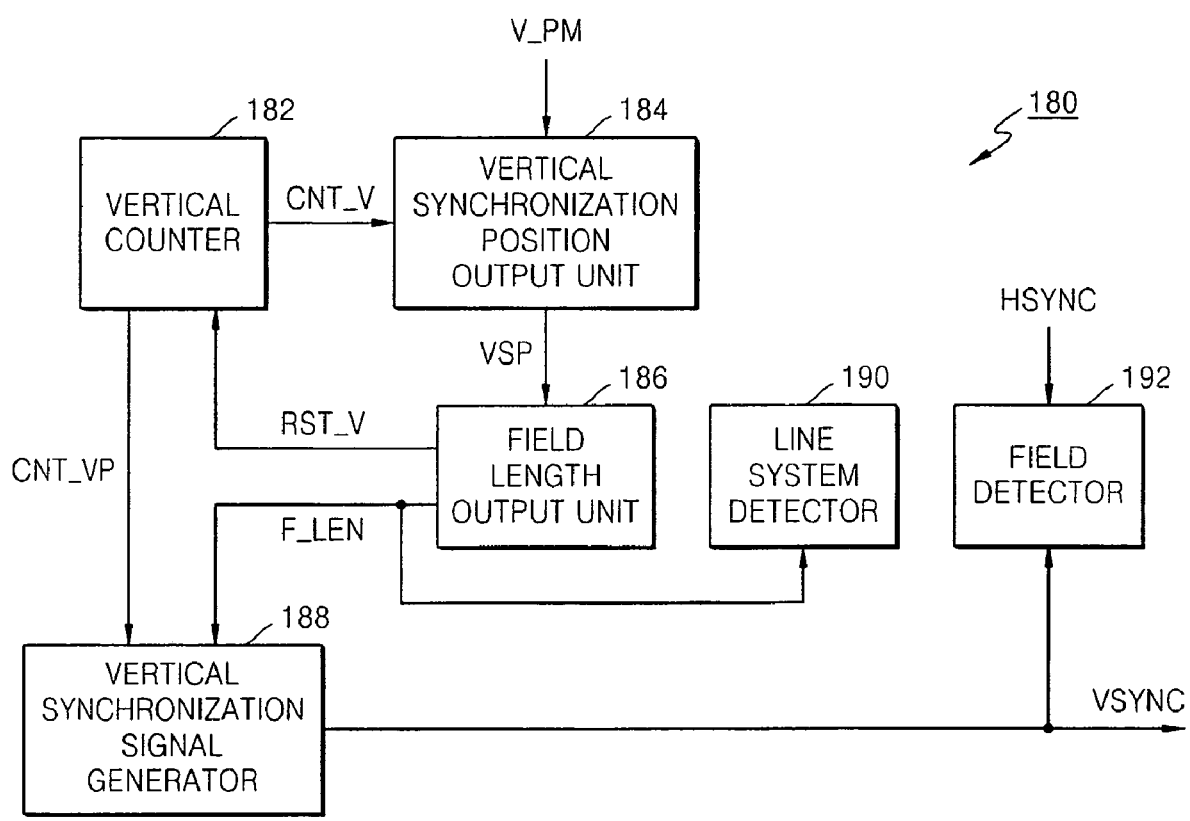
FIG. 9 is a block diagram of a vertical synchronization detection unit of FIG. 7.

FIG. 9 is a block diagram of the vertical synchronization detection unit 180 of FIG. 7. Referring to FIG. 9, the vertical synchronization detection unit 180 includes a vertical counter 182, a vertical synchronization position output unit 184, a field length output unit 186 and a vertical synchronization signal generator 188. The vertical synchronization detection unit 180 further includes a line system detector 190 and a field detector 192.

The vertical synchronization position output unit 184 outputs a vertical synchronization position VSP that contains time information (for example, T3 or T4 of FIG. 6B) corresponding to a local minimum value (for example, LMV1 or LMV2 of FIG. 6B) of a vertical synchronization parameter V_PM in response to vertical count values CNT_V output from the vertical counter 182.

The field length output unit 186 calculates a difference (for example, T4−T3) between vertical synchronization positions VSP to generate the current field length detection value. The field length output unit 186 generates a vertical reset signal RST_V to reset the vertical counter 182 when the current field length detection value is generated.

The field length output unit 186 adds the current field length detection value to a previous field length detection value by which 31, as an example of a first vertical coefficient, has been multiplied, divides the added value by 32, as an example of a second vertical coefficient, and stores and outputs the resultant value as a final field length detection value F_LEN. The final field length detection value F_LEN is used as a previous field length detection value when a subsequent final field length detection value is calculated. The first vertical coefficient represents a weighted value.

That is, the field length output unit 186 performs an operation represented by Equation 2 to output the final field length detection value F_LEN corresponding to an auto regression value. The final field length detection value F_LEN in the NTSC standard approximates the length of 225,225 samples (=(858*525)/2 samples) through auto regression.

Final field length detection value=(31*previous field length detection value+current field length detection value)/32 [Equation 2]

The vertical synchronization signal generator 188 generates the vertical synchronization signal VSYNC using a vertical position count value CNT_VP that is one of the vertical count values CNT_V and corresponds to the vertical synchronization position VSP and the final field length detection value F_LEN.

Accordingly, the synchronization detector of the video signal processor according to an embodiment of the present invention converts the input analog video signal into bit values corresponding to quantization values, sequentially stores the bit values in the line buffer, and generates the horizontal and vertical synchronization signals using time information related to local minimum values of the bit values. Thus, the horizontal and vertical synchronization signals can be effectively detected even when the input analog video signal includes noise.

The line system detector 190 detects a line system of the input analog video signal IVS in response to the final field length detection value F_LEN. For example, the line system of the input analog video signal IVS can be the NTSC line system when the final field length detection value F_LEN is approximately the length of 225,225 samples (=(858*525)/2 samples), and the line system of the input analog video signal IVS can be the PAL line system when the final field length detection value F_LEN is approximately the length of 270,000 samples (=(864*625)/2 samples).

The field detector 192 detects whether the field of the input analog video signal IVS is an odd field or an even field using the phase relation between the horizontal synchronization signal HSYNC output from the horizontal synchronization detection unit 150 and the vertical synchronization signal VSYNC.

Figure 10:
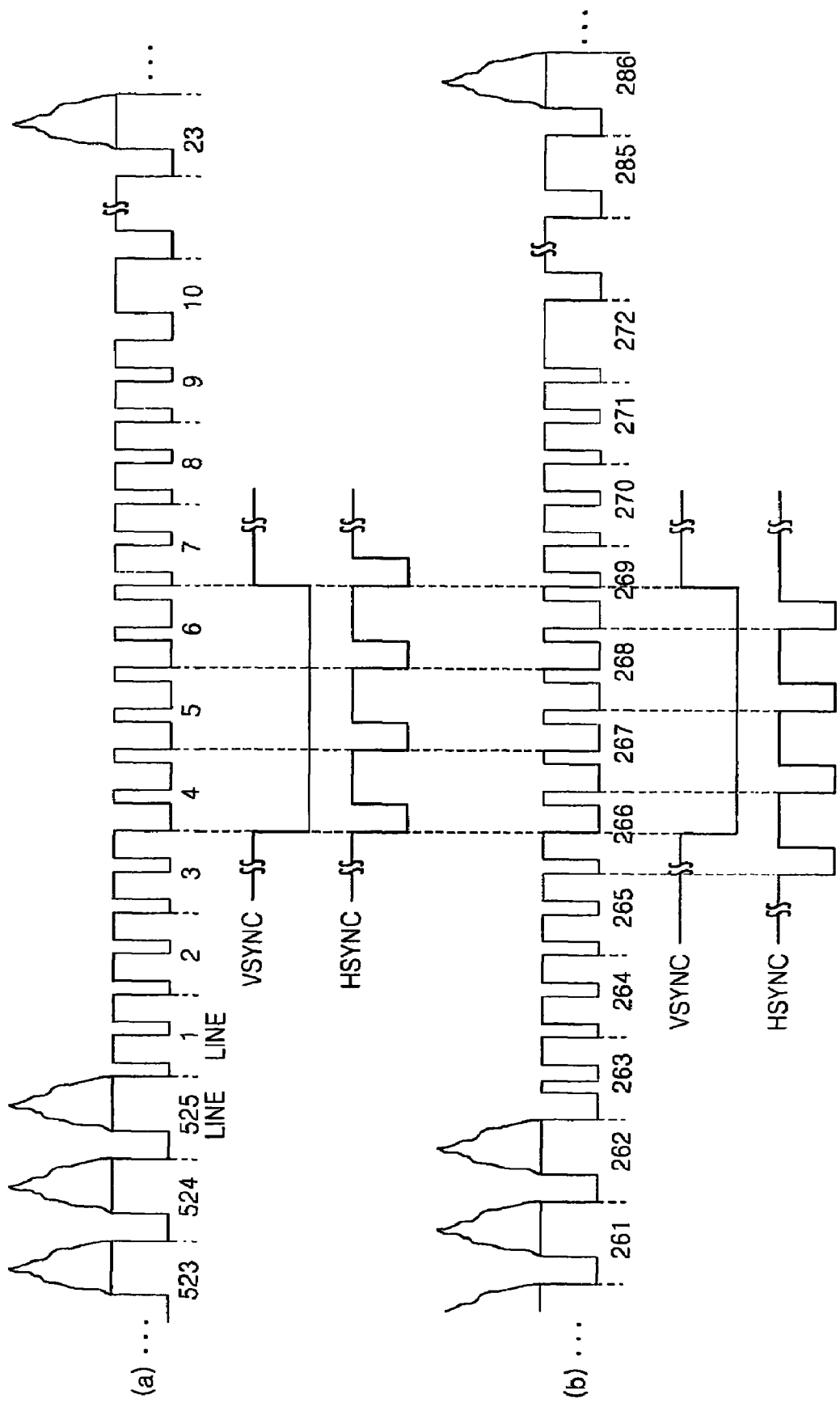
FIGS. 10A and 10B are diagrams for explaining a field detecting operation of a field detector of FIG. 9.

FIG. 10 is a diagram for explaining a field detecting operation of the field detector 192 of FIG. 9. FIGS. 10A and 10B illustrate a CVBS signal of the NTSC standard used as the input analog video signal IVS.

FIG. 10A illustrates an odd field of the input analog video signal IVS because the vertical and horizontal synchronization signals VSYNC and HSYNC are generated in the same time period (or same phase). FIG. 10B illustrates an even field of the input analog video signal IVS because the horizontal synchronization signal HSYNC is generated prior to the vertical synchronization signal VSYNC (that is, the phase of the horizontal synchronization signal HSYNC precedes that of the vertical synchronization signal VSYNC by 180°).

Figure 11:
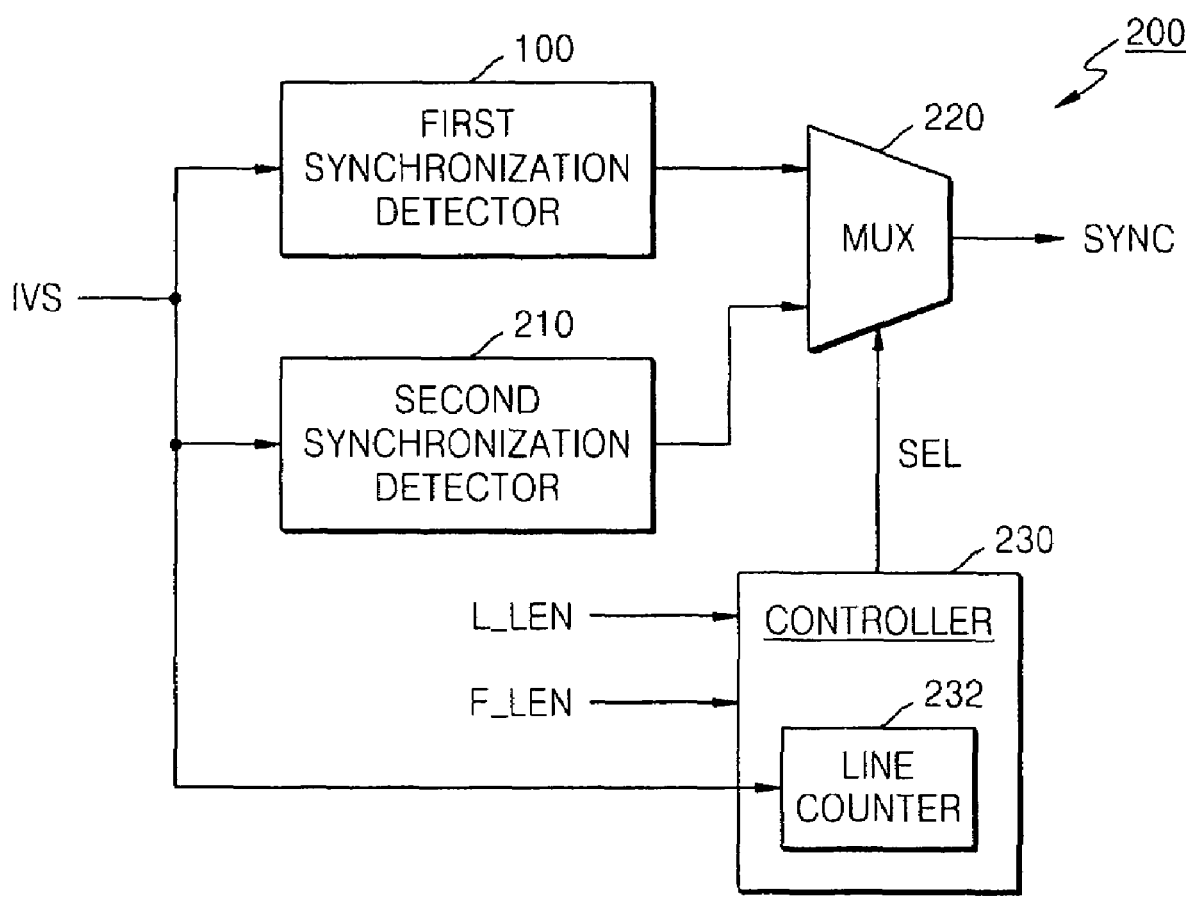
FIG. 11 is a block diagram of a synchronization selector of a video signal processor including the synchronization detector of FIG. 3 according to an embodiment of the present invention.

FIG. 11 is a block diagram of a synchronization selector 200 of a video signal processor including the synchronization detector of FIG. 3 according to an embodiment of the present invention. Referring to FIG. 11, the synchronization selector 200 of the video signal processor includes a first synchronization detector 100, a second synchronization detector 210, a multiplexer (MUX) 220 and a controller 230.

The first synchronization detector 100 corresponds to the synchronization detector 100 of FIG. 3 and is used to detect a synchronization signal in a video signal processor such as a TV system or an optical disk player receiving an input analog video signal IVS including lines having a specific line length. The second synchronization detector 210 is used to detect a synchronization signal in a video signal processor such as a video cassette recorder (VCR) receiving an input analog video signal IVS including lines having different line lengths.

The MUX 220 selects one of the synchronization signals output from the first and second synchronization detectors 100 and 210 in response to a selection signal SEL and outputs the selected synchronization signal SYNC. The synchronization signal SYNC includes horizontal and vertical synchronization signals and is used in a TV system, an optical disk player or a VCR. For example, the MUX 220 outputs the output signal of the first synchronization detector 100 as the synchronization signal SYNC when the selection signal SEL is at a logic low level and outputs the output signal of the second synchronization detector 210 as the synchronization signal SYNC when the selection signal SEL is at a logic high level.

The controller 230 generates the selection signal SEL in response to a line length L_LEN, a field length F_LEN or the input analog video signal IVS. The length L_LEN of a line included in the field of the input analog video signal IVS and the field length F_LEN are detected by the first and second synchronization detectors 100 and 210 and provided to the controller 230.

The controller 230 calculates the absolute value of a difference between the line lengths of neighboring lines. The controller 230 generates a selection signal SEL for selecting the output signal of the first synchronization detector 100 when the absolute value is smaller than or identical to a predetermined reference value. The controller 230 generates a selection signal SEL for selecting the output signal of the second synchronization detector 210 when the absolute value is larger than the reference value.

Furthermore, the controller 230 calculates the absolute values of differences between the line lengths of neighboring lines. The controller 230 generates the selection signal SEL for selecting the output signal of the first synchronization detector 100 when the sum of the absolute values in the field length F_LEN is smaller than or identical to a predetermined reference value and generates the selection signal SEL for selecting the output signal of the second synchronization detector 210 when the sum is larger than the reference value.

Moreover, the controller 230 calculates a value obtained by dividing the field length F_LEN by ½ of the number of lines of the input analog video signal IVS (for example, 525 lines in the case of NTSC standard) and the absolute value of a value obtained by subtracting the line length L_LEN from the divided field length F_LEN. The controller 230 generates the selection signal SEL for selecting the output signal of the first synchronization detector 100 when the sum of the absolute values in the field length F_LEN is smaller than or identical to a predetermined reference value and generates the selection signal SEL for selecting the output signal of the second synchronization detector 210 when the sum is larger than the reference value.

The controller 230 includes a line counter 232 for counting the lines of the input analog video signal IVS. The controller 230 generates the selection signal SEL for selecting the output signal of the first synchronization detector 100 when the value counted by the line counter 232 is continuous and generates the selection signal SEL for selecting the output signal of the second synchronization detector 210 when the counted value is discrete.

Accordingly, the synchronization selector of the video signal processor according to the present invention can select a synchronization signal suitable for a TV system, an optical disk player or a VCR using the line length and the field length detected from the first synchronization detector suitable for detecting a synchronization signal from an analog video signal input to the TV system or the optical disk player and the second synchronization detector suitable for detecting a synchronization signal from an analog video signal input to the VCR.

While the present invention has been particularly shown and described with reference to exemplary embodiments thereof, it will be understood by those of ordinary skill in the art that various changes in form and detail may be made herein without departing from the spirit and scope of the present invention as defined by the following claims.

What is claimed is:

1. A synchronization detector of a video signal processor comprising:
    a line buffer that sequentially stores a digital video signal corresponding to an input analog video signal, unit analog video signal;
    a parameter extraction unit that continuously extracts horizontal synchronization parameters from the digital video signal stored line by line and that continuously extracts vertical synchronization parameters from a portion of the digital video signal stored line by line;
    a synchronization detection unit that generates horizontal and vertical synchronization signals of the input analog video signal using time information related to local minimum values of the horizontal synchronization parameters and time information related to local minimum values of the vertical synchronization parameters; and
    a video signal processing unit that converts the input analog video signal into a digital video signal to conform the input analog video signal to a standard level of a video signal processed in the video signal processor and that removes a color component from the digital video signal to output a filter output signal including a luminance signal and a synchronization signal, the filter output signal corresponding to the digital video signal.

2. The synchronization detector of claim 1, wherein the input analog video signal comprises a CVBS signal, a separate video signal or a component signal.

3. The synchronization detector of claim 1, wherein the video signal processing unit comprises:
    an analog-to-digital converter that samples the input analog video signal and that converts the input analog video signal into the digital video signal to conform the input analog video signal to the standard level of the video signal; and
    a low pass filter that low-pass-filters an output signal of the analog-to-digital converter to remove a color burst signal and a chrominance signal and that generates the filter output signal.

4. The synchronization detector of claim 3, wherein the line buffer comprises:
    a bit value output unit that quantizes the filter output signal line by line and that outputs bits corresponding to the quantization values;
    an upper bit selection unit that selects upper bits from the bits and that outputs the upper bits; and line memories that sequentially stores the upper bits corresponding to data included in the lines, respectively.

5. The synchronization detector of claim 4, wherein the parameter extraction unit adds up the upper bits respectively stored in the line memories for continuous samples included in each line to obtain sum values corresponding to the number of the line memories, adds up the sum values to obtain the horizontal synchronization parameter at a predetermined time, and adds up the upper bits stored in a part of the line memories to obtain the vertical synchronization parameter at a predetermined time.

6. The synchronization detector of claim 5, wherein the synchronization detection unit comprises:
 a horizontal synchronization detection unit that generates the horizontal synchronization signal using time information related to the local minimum values of the horizontal synchronization parameters; and
 a vertical synchronization detection unit that generates the vertical synchronization signal using time information related to the local minimum values of the vertical synchronization parameters.

7. The synchronization detector of claim 6, wherein the horizontal synchronization detection unit comprises:
 a horizontal counter that outputs horizontal count values;
 a horizontal synchronization position output unit that outputs horizontal synchronization positions corresponding to time information related to the local minimum values of the horizontal synchronization parameters in response to the horizontal count values;
 a line length output unit that calculates a difference between the horizontal synchronization positions to generate the current line length detection value, that resets the horizontal counter whenever generating the current line length detection value, that adds the current line length detection value to a previous line length detection value to which a first horizontal coefficient has been multiplied, that divides the added value by a second horizontal coefficient, and that stores and outputs the resultant value as a final line length detection value; and
 a horizontal synchronization signal generator that generates the horizontal synchronization signal using a horizontal position count value that is one of the horizontal count values and corresponds to the horizontal synchronization positions and the final line length detection value,
 wherein the final line length detection value is used as a previous line length detection value when a subsequent final line length detection value is calculated.

8. The synchronization detector of claim 7, wherein the vertical synchronization detection unit comprises:
 a vertical counter that outputs vertical count values;
 a vertical synchronization position output unit that outputs vertical synchronization positions corresponding to time information related to the local minimum values of the vertical synchronization parameters in response to the vertical count values;
 a field length output unit that calculates a difference between the vertical synchronization positions to generate the current field length detection value, that resets the vertical counter whenever generating the current field length detection value, that adds the current field length detection value to a previous field length detection value to which a first vertical coefficient has been multiplied, that divides the added value by a second vertical coefficient, and that stores and outputs the resultant value as a final field length detection value; and
 a vertical synchronization signal generator that generates the vertical synchronization signal using a vertical position count value that is one of the vertical count values and corresponds to the vertical synchronization positions and the final field length detection value,
 wherein the final field length detection value is used as a previous field length detection value when a subsequent final field length detection value is calculated.

9. The synchronization detector of claim 8, wherein the vertical synchronization detection unit further comprises:
 a line system detector that detects a line system of the input analog video signal in response to the final field length detection unit; and
 a field detector that detects whether the field of the input analog video signal is an odd field or an even field using the phase relation of the horizontal synchronization signal and the vertical synchronization signal.

10. A synchronization selector of a video signal processor comprising:
 a first synchronization detector that detects a synchronization signal in a video signal processor receiving an input analog video signal including lines having a specific length;
 a second synchronization detector that detects a synchronization signal in a video signal processor receiving an input analog video signal including lines having different lengths;
 a multiplexer that selects one of the synchronization signals respectively output from the first and second synchronization detectors in response to a selection signal and that outputs the selected synchronization signal; and
 a controller that generates the selection signal in response to at least one of the input analog video signal, a field length of the input analog video signal and a length of a line included in the field of the input analog video signal, which are detected by the first and second synchronization detectors,
 wherein the first synchronization detector comprises:
 a line buffer that sequentially stores a digital video signal corresponding to the input analog video signal line by line of the input analog video signal;
 a parameter extraction unit that continuously extracts horizontal synchronization parameters from the digital video signal stored line by line and that continuously extracts vertical synchronization parameters from a portion of the digital video signal stored line by line; and
 a synchronization detection unit that outputs the field length and the line length using time information related to local minimum values of the horizontal synchronization parameters and time information related to local minimum values of the vertical synchronization parameters.

11. The synchronization selector of claim 10, wherein the output signal of the first synchronization detector is used for a TV system or an optical disk player and the output signal of the second synchronization detector is used for a VCR.

12. The synchronization selector of claim 10, wherein the controller calculates the absolute value of a difference between the line lengths of neighboring lines and generates the selection signal for selecting the output signal of the first synchronization detector when the absolute value is less than or equal to a predetermined reference value.

13. The synchronization selector of claim 10, wherein the controller calculates the absolute values of differences between the line lengths of neighboring lines and generates the selection signal for selecting the output signal of the first synchronization detector when the sum of the absolute values in the field length less than or equal to a predetermined reference value.

14. The synchronization selector of claim 10, wherein the controller calculates a value obtained by dividing the field length by ½ of the number of the lines of the input analog video signal and the absolute value of a value obtained by subtracting the line length from the divided field length and generates the selection signal for selecting the output signal of the first synchronization detector when the sum of the absolute values in the field length is less than or equal to a predetermined reference value.

15. The synchronization selector of claim 10, wherein the controller comprises a line counter that counts the lines of the input analog video signal and generates the selection signal for selecting the output signal of the first synchronization detector when the value counted by the line counter is continuous.

* * * * *